(12) United States Patent
Bolling et al.

(10) Patent No.: US 11,210,675 B2
(45) Date of Patent: Dec. 28, 2021

(54) METHODS AND APPARATUSES FOR MOBILE RETURNS

(71) Applicant: Home Depot Product Authority, LLC, Atlanta, GA (US)

(72) Inventors: Heather Bolling, Atlanta, GA (US); Kenneth Dunn, Atlanta, GA (US); Troy Gerstenberger, Atlanta, GA (US); Brenda L. Peregoy, Atlanta, GA (US); Billy Putman, Atlanta, GA (US); Say Tomic, Atlanta, GA (US)

(73) Assignee: Home Depot Product Authority, LLC, Atlanta, GA (US)

( * ) Notice: Subject to any disclaimer, the term of this patent is extended or adjusted under 35 U.S.C. 154(b) by 0 days.

(21) Appl. No.: 16/298,570

(22) Filed: Mar. 11, 2019

(65) Prior Publication Data

US 2019/0205883 A1 Jul. 4, 2019

Related U.S. Application Data

(63) Continuation of application No. 14/726,080, filed on May 29, 2015, now Pat. No. 10,229,413.

(51) Int. Cl.
*G06Q 20/20* (2012.01)
*G06Q 20/40* (2012.01)
(Continued)

(52) U.S. Cl.
CPC ......... *G06Q 20/407* (2013.01); *G06Q 20/202* (2013.01); *G06Q 20/3223* (2013.01); *G06Q 20/387* (2013.01); *G07F 7/06* (2013.01)

(58) Field of Classification Search
CPC .............. G06Q 20/407; G06Q 20/202; G06Q 20/3223; G06Q 20/387; G07F 7/06
See application file for complete search history.

(56) References Cited

U.S. PATENT DOCUMENTS

| | | | | |
|---|---|---|---|---|
| 6,975,937 | B1 * | 12/2005 | Kantarjiev | G06Q 10/08 340/990 |
| 8,676,653 | B2 * | 3/2014 | Argue | G06Q 20/047 705/17 |
| 9,697,548 | B1 * | 7/2017 | Jaff | G06Q 30/0601 |
| 10,235,710 | B2 * | 3/2019 | Agasti | G06Q 30/0643 |

(Continued)

FOREIGN PATENT DOCUMENTS

WO 2013130031 9/2013

OTHER PUBLICATIONS

Mexican Patent Office, Office Action issued in Mex. Patent Appln. No. MX/a/2016/015835, dated Feb. 18, 2021, 7 pgs.

(Continued)

*Primary Examiner* — Talia F Crawley
(74) *Attorney, Agent, or Firm* — Greenberg Traurig, LLP

(57) ABSTRACT

A method includes initiating a session of a mobile returns interface on a mobile device, and the mobile device communicates with a server. The method further includes receiving receipt information through the mobile returns interface and sending a receipt information validation request to the server. The method further includes receiving, from the server, a first validation that the receipt information is stored on the one or more servers. The method further includes receiving item information through the mobile returns interface and sending an item information validation request to the server. The method further includes receiving, from the server, a second validation that the item information is stored on the server. The method further includes performing an item transaction associated with the receipt information and the item information in response to receiving the first validation and the second validation.

15 Claims, 15 Drawing Sheets

(51) Int. Cl.
*G06Q 20/32* (2012.01)
*G06Q 20/38* (2012.01)
*G06F 7/06* (2006.01)
*G07F 7/06* (2006.01)

(56) References Cited

U.S. PATENT DOCUMENTS

| | | | | |
|---|---|---|---|---|
| 2007/0050258 A1* | 3/2007 | Dohse | ............... | G06Q 30/02 |
| | | | | 705/14.35 |
| 2008/0011844 A1 | 1/2008 | Tami et al. | | |
| 2011/0231272 A1* | 9/2011 | Englund | ............... | G06Q 20/20 |
| | | | | 705/21 |
| 2013/0048723 A1* | 2/2013 | King | ............... | G06Q 30/0633 |
| | | | | 235/383 |
| 2014/0006199 A1* | 1/2014 | Grigg | ............... | G06Q 30/06 |
| | | | | 705/26.1 |
| 2014/0006224 A1* | 1/2014 | Grigg | ............... | G06Q 10/0837 |
| | | | | 705/28 |
| 2014/0040050 A1* | 2/2014 | Argue | ............... | G06Q 20/3276 |
| | | | | 705/16 |
| 2014/0040053 A1* | 2/2014 | Argue | ............... | G06Q 20/3276 |
| | | | | 705/17 |
| 2014/0122270 A1* | 5/2014 | Argue | ............... | G06Q 20/047 |
| | | | | 705/21 |
| 2014/0122276 A1* | 5/2014 | Argue | ............... | G06Q 20/20 |
| | | | | 705/24 |
| 2015/0026351 A1* | 1/2015 | Calman | ............... | H04L 65/1083 |
| | | | | 709/227 |
| 2015/0088781 A1* | 3/2015 | Gillen | ............... | G06Q 10/083 |
| | | | | 705/340 |

OTHER PUBLICATIONS

Translation of Mexican Patent Office, Office Action issued in Mex. Patent Appln. No. MX/a/2016/015835, dated Feb. 18, 2021, 4 pgs.
Mexican Patent Office, Office Action issued in Mex. Patent Appln. No. MX/a/2016/015835, dated Dec. 2, 2019, 9 pgs.

* cited by examiner

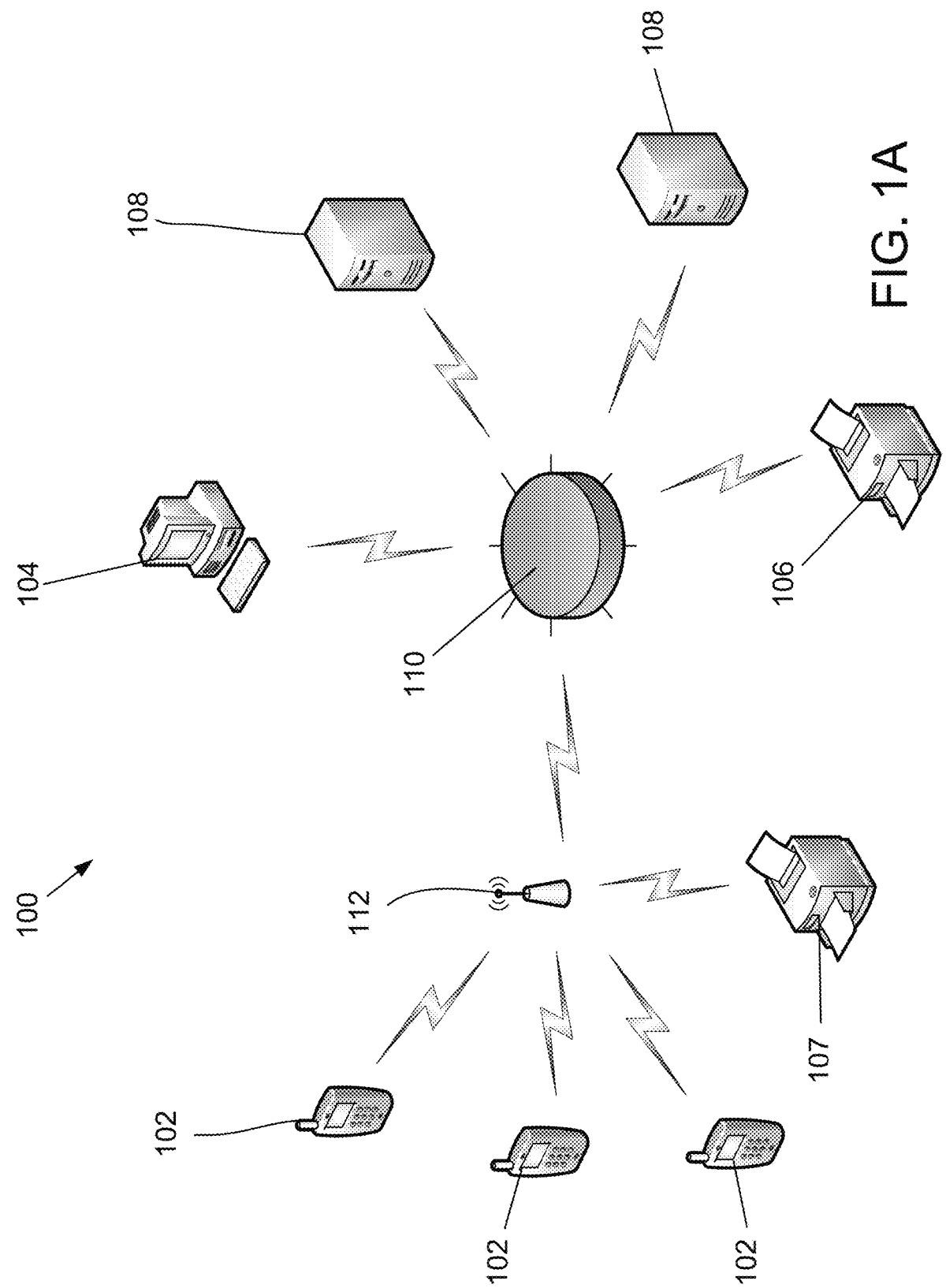

METHODS AND APPARATUSES FOR MOBILE RETURNS

CROSS REFERENCE TO RELATED APPLICATION

This application is a continuation of and claims priority to U.S. patent application Ser. No. 14/726,080 (now granted as U.S. Pat. No. 10,229,413), the disclosure of which is incorporated by reference herein in its entirety.

BACKGROUND

Field of the Invention

This disclosure relates generally to methods and apparatuses that can be used to facilitate the mobile return of a previously purchased item.

Description of Related Art

In a conventional returns process, which has essentially been unchanged for decades, customers may wait in a dedicated returns or customer service line to speak to a returns cashier. Customers can be assisted only upon reaching the returns cashier. During peak times, customers may wait in line for extended periods of time, which increases the amount of time to process customer returns and decreases customer satisfaction.

Handheld mobile devices with network connectivity have been used by retail store associates to update and review inventory levels, access product information, select items from online orders, send and receive phone calls, and scan or search for items for quicker checkout.

SUMMARY

This disclosure includes embodiments of methods, apparatuses, and systems for facilitating mobile returns. In some embodiments, mobile returns can be conducted by store employees using handheld mobile devices. The mobile devices may have network connectivity that enables the employee to conduct a variety of tasks. These tasks may include updating and viewing inventory levels, accessing product information, picking items from online orders, sending and receiving phone calls, and scanning or searching for items for quicker checkout. The mobile device may enable the employee to process returns at locations other than a customer service desk, cash register, or dedicated returns register. An employee may process a return while a customer waits in line for another transaction. An employee may also process a return at a remote location inside or outside of the store. This functionality may be useful in cases where it may not be feasible or convenient for the customer to carry the product into the store or to a returns register to process a return.

In some embodiments, a method for facilitating returns may comprise initiating a session of a mobile returns interface on a handheld mobile device. The mobile device may be configured to communicate with one or more servers. In some embodiments, an employee inputs receipt information into the mobile device. In some embodiments, the receipt information is sent to a server among the one or more servers. If the receipt information is found to match a record stored in the server, the employee may receive an indication that the receipt information is stored in a server among the one or more servers. In some embodiments, the employee inputs item information into the mobile device. In some embodiments, the item information is sent to a server among the one or more servers. If the item information is found to match the receipt information, the employee may receive an indication that the item information is stored in a server among the one or more servers. In some embodiments, the employee then performs an item transaction.

In some embodiments, the method further comprises receiving an indication that the receipt information is not stored in a server among the one or more servers. In some embodiments, if the receipt information is not stored in a server, the session is terminated. In some embodiments, the method further comprises receiving an indication that the item information is not stored in a server among the one or more servers. In some embodiments, if the item information is not stored in a server, the session is terminated.

In some embodiments, the method further comprises determining, based on information from a server among the one or more servers, an identity of a tax exempt customer. In some embodiments, the method further comprises tendering a tax compensation to the tax exempt customer, where the tendering may be performed separately from a tendering of a price compensation to the tax exempt customer. In some embodiments, the tax return transaction may be the only transaction performed.

In some embodiments, the method further comprises determining, based on information from a server among the one or more servers, an identity of a rewards customer. In some embodiments, the method comprises tendering a rewards compensation to the rewards customer, where the tendering may be performed separately from a tendering of a price compensation to the rewards customer. In some embodiments, the rewards compensation may be the only transaction performed but may only be performed after a return transaction is previously initiated.

In some embodiments, the method further comprises receiving a coupon from a customer and determining, based on information from a server among the one or more servers, coupon information. In some embodiments, the method further comprises tendering a coupon compensation to the customer, where the tendering may be performed separately from a tendering of a price compensation to the customer. In some embodiments, the coupon compensation may be the only transaction performed but may only be performed after a return transaction is previously initiated.

In some embodiments, inputting receipt information into the mobile device comprises scanning a receipt using a scanner of the mobile device. In some embodiments, inputting receipt information into the mobile device comprises inputting receipt information using a keypad interface of the mobile device. In some embodiments, inputting receipt information into the mobile device comprises inputting customer identification information using a keypad interface of the mobile device.

In some embodiments, inputting item information into the mobile device comprises scanning an item using a scanner of the mobile device. In some embodiments, inputting item information into the mobile device comprises inputting item information using a keypad interface of the mobile device. In some embodiments, inputting item information into the mobile device comprises inputting customer identification information using a keypad interface of the mobile device.

In some embodiments, the method further comprises sorting items matching the item information using various headers. In some embodiments, the various headers comprising one or more of identification numbers, quantity values, retail prices, item descriptions, and extended retail.

In some embodiments, the item transaction comprises suspending a return transaction for an item. In some embodiments, the method further comprises accessing an online inventory software located on a server among the one or more servers, searching the online inventory software using the item information, and receiving search results at the mobile device.

In some embodiments, the item transaction comprises flagging an item for further review. In some embodiments, the item transaction comprises processing a return transaction and tendering a price compensation to a customer. In some embodiments, the item transaction further comprises voiding the return transaction. In some embodiments, the item transaction further comprises processing a return-to-vendor (RTV) transaction. In some embodiments, the method further comprises generating a request for one or more reports of the item transaction and receiving a report among the one or more reports from a server among the one or more servers at the mobile device.

In some embodiments, the price compensation is a store credit, an electronic store credit or a credit card refund. In some embodiments, the item transaction comprises capturing a customer signature on the mobile device and generating a transaction receipt. In some embodiments, generating a transaction receipt comprises printing the receipt. In some embodiments, generating a transaction receipt comprises sending an electronic receipt to an email address or a registered electronic user account.

In some embodiments, the method further comprises recalling a suspended return transaction and completing the suspended return transaction. In some embodiments, the suspended return transaction expires if not recalled before a certain time limit.

The computer system supporting the mobile returns may be configured to provide multiple mobile returns modes that correspond to differing levels of employee training. In some embodiments, the levels include first and second levels, where the functionality of the mode accessible to an employee who has attained the first level of training is a subset of the functionality of the mode accessible to an employee who has attained the second level of training. Examples of these modes include an expedited mode and a trained mode.

In some embodiments, a mobile device may be programmed for both an expedited mode and a trained mode. In some embodiments, an employee who has attained a certain training level may choose to use either an expedited mode or a trained mode. In some embodiments, an employee who has not attained an adequate training level may only choose an expedited mode. In some embodiments, an employee may be granted access to either an expedited mode or a trained mode based on identifying information such as login credentials. For example, when a trained employee enters login credentials, the trained employee may be automatically granted access to the trained mode. When an untrained employee enters login credentials, the untrained employee may be automatically granted access to the expedited mode. In some embodiments, the mobile devices may be preprogrammed with either a trained mode or an expedited mode. The mobile devices preprogrammed with a trained mode may be distributed to employees who have attained a certain training level while the mobile devices preprogrammed with an expedited mode may be distributed to employees who have not attained the training level of the training mode employees.

In some embodiments, a method for facilitating mobile returns in an expedited mode comprises initiating a session of a mobile returns interface on a mobile device, the mobile device configured to communicate with one or more servers, inputting receipt information into the mobile device, sending the receipt information to a server among the one or more servers, receiving an indication that the receipt information is stored in a server among the one or more servers, inputting item information into the mobile device, sending the item information to a server among the one or more servers, receiving an indication that the item information is stored in a server among the one or more servers; and suspending a return transaction for an item. In some embodiments, the expedited mode is used by employees that are not qualified to use other modes.

In some embodiments, a method for facilitating mobile returns in a trained mode comprises initiating a session of a mobile returns interface on a mobile device, the mobile device configured to communicate with one or more servers, inputting receipt information into the mobile device, sending the receipt information to a server among the one or more servers, receiving an indication that the receipt information is stored in a server among the one or more servers, inputting item information into the mobile device, sending the item information to a server among the one or more servers, receiving an indication that the item information is stored in a server among the one or more servers, performing an item return transaction, capturing a customer signature on the mobile device, and generating a transaction receipt.

In some embodiments, a mobile device for facilitating mobile returns comprises a graphical user interface (GUI) comprising one or more graphical elements configured to implement, using at least one processor, one or more software applications stored on one or more servers. In some embodiments, the software applications are configured to initiate a session of a mobile returns interface on the mobile device, receive receipt information from a user, send the receipt information to a server among the one or more servers, receive an indication that the receipt information is stored in a server among the one or more servers, receive item information from a user, send the item information to a server among the one or more servers, receive an indication that the item information is stored in a server among the one or more servers, and perform an item transaction.

In some embodiments, a non-transitory computer readable medium stores a program comprising instructions executable by a machine to initiate a session of a mobile returns interface on a handheld mobile device. In some embodiments, the mobile device is configured to communicate with one or more servers, input receipt information into the mobile device, send the receipt information to a server among the one or more servers, receive an indication that the receipt information is stored in a server, input item information into the mobile device, send the item information to a server among the one or more servers, receive an indication that the item information is stored in a server among the one or more servers, and perform an item transaction.

In some embodiments, the program further comprises instructions executable by a machine to receive an indication that the receipt information is not stored in a server and terminate the session. In some embodiments, the program further comprises instructions executable by a machine to receive an indication that the item information is not stored in a server and terminate the session. In some embodiments, the program further comprises instructions executable by a machine to determine, based on information from a server, an identity of a tax exempt customer and tender a tax compensation to the tax exempt customer, where the tender may be performed separately from a tender of a price compensation to the tax exempt customer. In some embodiments, the program further comprises instructions executable by a machine to determine, based on information from the server, an identity of a rewards customer and tender a rewards compensation to the rewards customer, where the tender may be performed separately from a tender of a price compensation to the rewards customer. In some embodiments, the program further comprises instructions executable by a machine to receive a coupon from a customer; determine, based on information from the server, coupon information; and tender a coupon compensation to the customer, where the tender may be performed separately from a tender of a price compensation to the rewards customer. In some embodiments, the program further comprises instructions executable by a machine to sort items matching the item information using various headers. In some embodiments, the program further comprises instructions executable by a machine to access an online inventory software located on a server, search the online inventory software using the item information, and receive search results at the mobile device. In some embodiments, the item transaction comprises instructions executable by a machine to process a return transaction and tender a price compensation to a customer. In some embodiments, the program further comprises instructions executable by a machine to generate a request for one or more reports of the item transaction and receive a report among the one or more reports from a server at the mobile device. In some embodiments, the item transaction comprises instructions executable by a machine to capture a customer signature on the mobile device and generate a transaction receipt. In some embodiments, the program further comprising instructions executable by a machine to recall a suspended return transaction and complete the suspended return transaction.

In some embodiments, a computing device for facilitating mobile returns comprises at least one processor, a memory device, and a display device configured to display a graphical user interface (GUI) comprising one or more graphical elements configured to implement, using the at least one processor, one or more software applications stored on one or more servers. In some embodiments, the software applications are configured to initiate a session of a mobile returns interface on the mobile device receive receipt information from a user, send the receipt information to a server among the one or more servers, receive an indication that the receipt information is stored in a server among the one or more servers, receive item information from a user, send the item information to a server among the one or more servers, receive an indication that the item information is stored in a server among the one or more servers, and perform an item transaction.

The terms "comprise" (and any form of compnse, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a systems, or a component of a systems, that "comprises," "has," "includes" or "contains" one or more elements or features possesses those one or more elements or features, but is not limited to possessing only those elements or features. Likewise, a method that "comprises," "has," "includes" or "contains" one or more steps possesses those one or more steps, but is not limited to possessing only those one or more steps. Additionally, terms such as "first" and "second" are used only to differentiate structures or features, and not to limit the different structures or features to a particular order.

Any embodiment of any of the disclosed systems or system components can consist of or consist essentially of-rather than comprise/include/contain/have-any of the described elements and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

The foregoing has outlined rather broadly certain features and technical advantages of embodiments of the present invention in order that the detailed description that follows may be better understood. Additional features and advantages will be described below. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

FIG. 1A depicts an exemplary network structure of an embodiment of a mobile returns system.

DETAILED DESCRIPTION OF ILLUSTRATIVE EMBODIMENTS

Figure 1B:
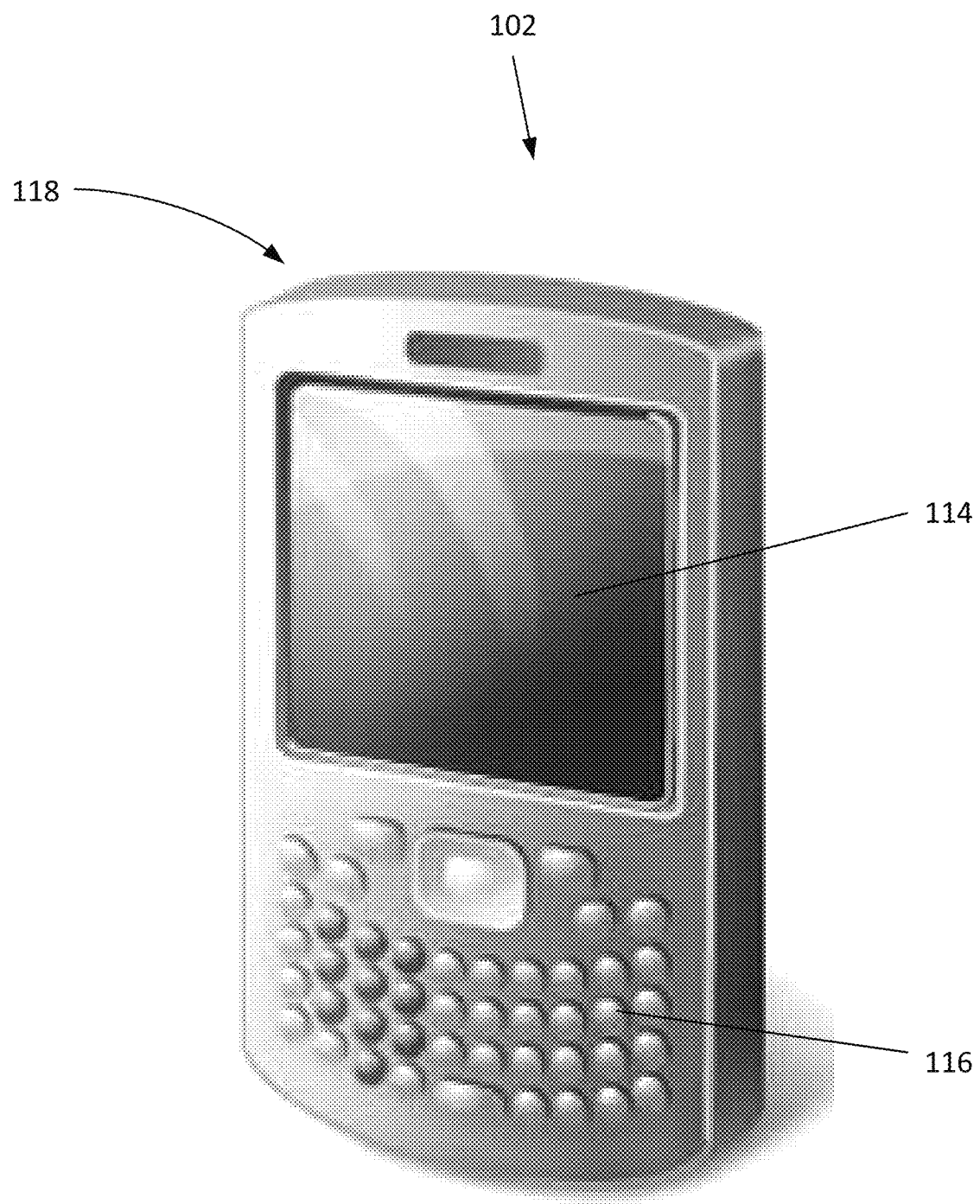
FIG. 1B shows an example of a handheld mobile device that may be used as mobile device.

Referring now to the drawings, and more particularly to FIG. 1A, mobile returns system 100, which is one embodiment of the disclosed systems, is shown. System 100 comprises one or more mobile devices 102, one or more computing devices 104, one or more printing devices 106, and one or more servers 108. System 100 may also comprise more or less mobile devices, computing devices, printing devices, and servers than shown in FIG. 1. In the embodiment shown, mobile devices 102, computing device 104, printing device 106, mobile printing device 107, and servers 108 are connected to network hub 110. Mobile devices 102 and mobile printing device 107 may connect to the network through wireless hub 112. Computing device 104, printing device 106, and servers 108 may be connected to network hub 110 via wired or wireless protocols.

Servers 108 may store a plurality of software applications. In the embodiment shown, mobile devices 102, computing device 104, and printing device 106 may access the software applications stored on servers 108 via network hub 110. Mobile devices 102 may be configured to access the software applications stored on servers 108, such as through having a user interface enabled to allow a user to access the software applications stored on servers 108. Mobile devices 102 may also communicate with computing device 104, printing device 106, and mobile printing device 107 to implement various functionalities of the software applications.

FIG. 1B shows an example of a handheld mobile device that may be used as mobile device 102. In the embodiment shown, mobile device 102 is not configured with a portion (such as a hinged and foldable portion, a translatable portion, or a portion that is foldable and/or translatable) that can move with respect to another portion. Mobile device 102 may occupy a volume no larger than 2.5 cubic inches. In some embodiments, mobile device 102 may comprise a tablet computing device. In other embodiments, mobile device 102 may further comprise a sub-tablet computing device. Mobile device 102 may comprise screen 114, keypad 116 (which may be separate from the screen, as shown, or which may appear on screen 114 in embodiments where screen 114 comprises a touchscreen), and a scanner, designated generally as element 118. A user may display embodiments of a mobile return interface (including those described and shown in this application) on screen 114. A user may input receipt and item information using keypad 116 or scanner 118. Mobile device 102 may include a processor, a memory component, a video card, an audio card, and a client application for interfacing with one or more of servers 108.

In some embodiments, the client application may comprise a thin client architecture. The client application may provide images, webpage wireframes, and cascading style sheets (CSS). In some embodiments, the client application may comprise a wireless key and/or an encryption algorithm. In some embodiments, the client application does not store any substantive sales or return transaction data, such as receipt information or credit card numbers, on the mobile device. As discussed above, this information may reside on one or more servers 108, therefore enhancing the security of sensitive and/or proprietary data. In some embodiments, the thin client architecture may reduce (potentially significantly) software load time and software update delays because the bulk of software applications may reside on one or more servers 108. Mobile device 102 is not limited to these components and may contain some, all, and/or additional components that enable the device to perform the functions described herein.

Figure 2:
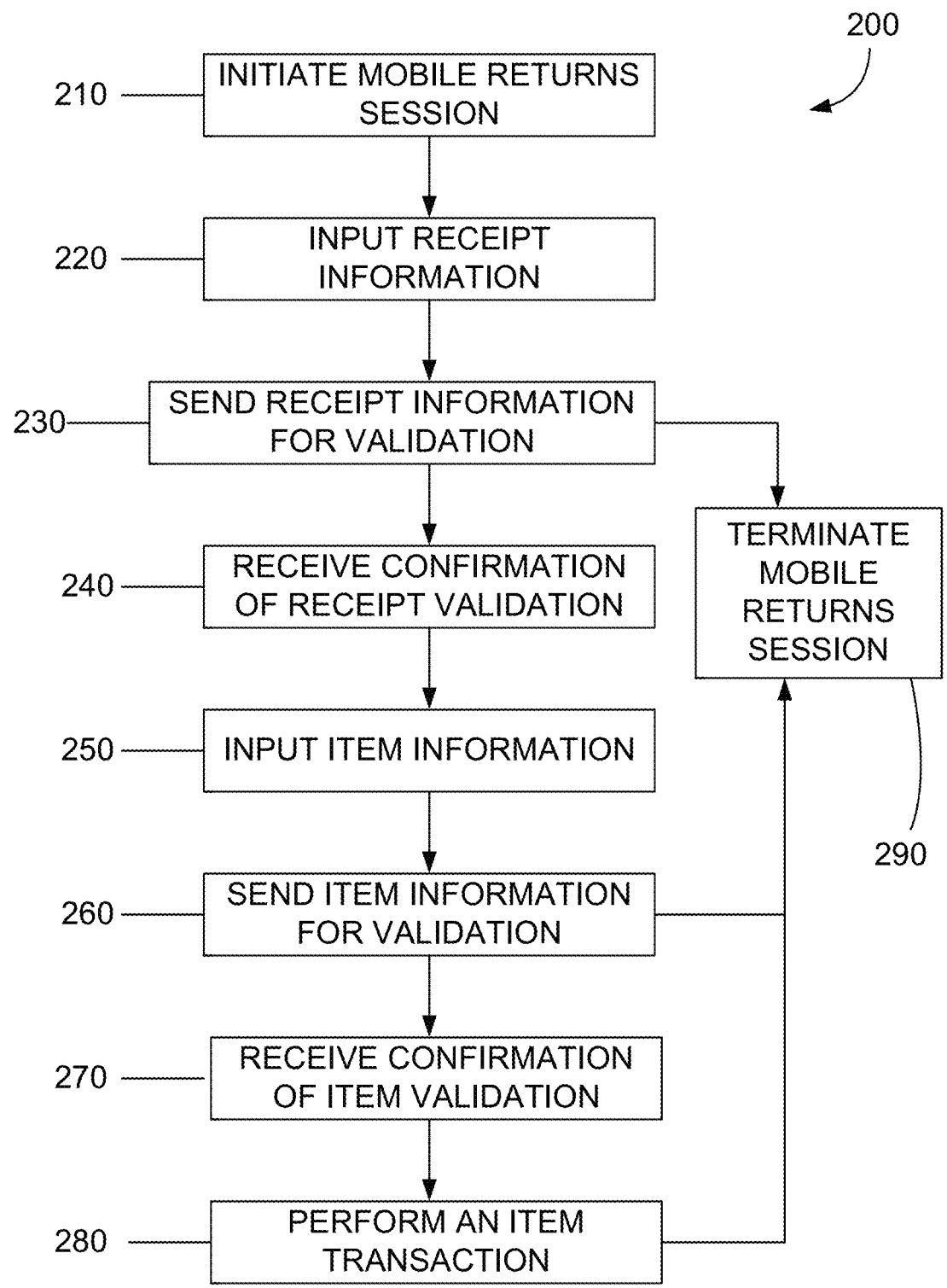
FIG. 2 depicts an embodiment of a mobile returns method.

FIG. 2 illustrates mobile returns method 200. In the embodiment shown, a user, who may be an employee or agent of a retail store (e.g., an associate, and, more specifically, a retail store associate), may begin method 200 at step 210, by initiating a mobile returns session. The user may initiate the mobile returns session by powering up or otherwise accessing a powered-up mobile device 102, accessing the user interface of mobile device 102, and selecting a returns action item.

The user may be located outside of a store in which she otherwise works during all or part of step 210, and the user may be prompted by a receipt holder (e.g., a store customer, such as someone who is not working at the same store at that time) to initiate a mobile returns session when one or both of the user and the receipt holder are located outside of the store in which the user otherwise works. If one or both of the user and the receipt holder are located in store where the user otherwise works at the time the receipt holder prompts the user to initiate a mobile returns sessions and/or during all or part of step 210, the user and receipt holder may be located such that there is no counter between them, and/or such that the user is not facing and/or beside a dedicated store terminal configured to facilitate a return. The user and/or the receipt holder may remain in or move to any of the foregoing locations during any part or all of the steps of method 200 and/or any or all of the other disclosed methods. The user may be characterized as not a returns cashier.

In the embodiment shown, the user may continue method 200 at step 220 by inputting receipt information into mobile device 102. Such receipt information may, more specifically, be receipt identification information that is linked (e.g., mapped) to information associated with (e.g., reflecting) one or more goods and/or services purchased by the owner or possessor of the receipt information (e.g., the person who has the receipt on which the receipt information is contained). The user may input receipt information by scanning a paper or electronic receipt with one or more scanners implemented on mobile device 102. Additionally or alternatively, the user may input receipt information by manually entering receipt information using the user interface (via a keypad, or via a touchscreen or touchpad) of mobile device 102.

After inputting the receipt information, the receipt information may be sent for validation at step 230, which sending may be performed automatically by mobile device 102 following receipt information entry, or following a further manual step by the user. For example, the receipt information may be sent to one or more of servers 108 through wireless hub 112 and network hub 110. Upon receipt of the receipt information from mobile device 102, one or more servers 108 may access one or more software applications to determine whether the receipt information is valid. Receipt information may be valid if it has previously been stored on, by, or using one or more servers 108. In the embodiment shown, if the receipt information cannot be validated or if no receipt is available, the mobile returns session is terminated at step 290.

In the embodiment shown, if the receipt information is validated, confirmation of the validation of receipt information is received (e.g., at mobile device 102) at step 240, following the sending of that confirmation information by or using one or more of servers 108.

When the user receives the confirmation of receipt information, the user may continue method 200 at step 250 by inputting item information (e.g., into mobile device 102). The user may input item information by scanning the item (which may be a product the receipt holder wants to return) with a scanner implemented on mobile device 102. For example, the user may scan a code (e.g., a bar code) on the item using mobile device 102. The user may also input item information by manually entering item information using the user interface (via a keypad, or via a touchscreen or touchpad) of mobile device 102. The user may also access a search tool software application (e.g., via mobile device 102) to enter search terms to lookup applicable item information. One example of a search tool software application that may be used in step 250 is the "Online Cashier Book," disclosed in copending and concurrently-filed U.S. patent application Ser. No. 14/726,034, which is incorporated by reference in this application.

In the embodiment shown, the user may continue method 200 at step 260 by sending the item information for validation, which sending may be performed automatically by mobile device 102 following item information entry, or following a further manual step by the user. For example, the item information may be sent to one or more servers 108 through wireless hub 112 and network hub 110, similarly to the receipt information. Upon receipt of the item information from mobile device 102, one or more servers 108 may access one or more software applications to determine whether the item information is valid. Item information may be valid if it has previously been stored on, by, or using one or more servers 108 and is associated with (e.g., mapped to) the receipt information, such as being part of a transaction (e.g., a sales transaction) associated with the receipt information. Valid item information may be characterized as "reconciled with" the receipt information. In the embodiment shown, if the item information cannot be validated or the item cannot be found, the mobile returns session is terminated at step 290.

In the embodiment shown, if the item information is validated, confirmation of the validation of the item information is received (e.g., at mobile device 102) at step 270, following the sending of that confirmation by or using one or more servers 108.

In the embodiment shown, the user may continue method 200 by performing an item transaction in step 280. The item transaction may be one or more of: tendering a credit to the customer, tendering a replacement item to the customer using a return-to-vendor (RTV) capability of mobile device 102, flagging the item for later review (e.g., by another associate, such as someone working at a dedicated store terminal configured to facilitate a return, who may be characterized as a returns cashier), voiding a return transaction, and suspending a return transaction for later completion (e.g., by another associate, such as someone working at a dedicated store terminal configured to facilitate a return, who may be characterized as a returns cashier). The item transaction may also comprise a tax refund or a refund rering for qualified customers. In some embodiments, the item transaction performed in step 280 may only be performed after a returns process has been previously initiated. In the embodiment show, item transaction step 280 is performed at the end of method 200. In other embodiments, item transaction step 280 may be performed as an intermediate step of method 200.

Figure 3:
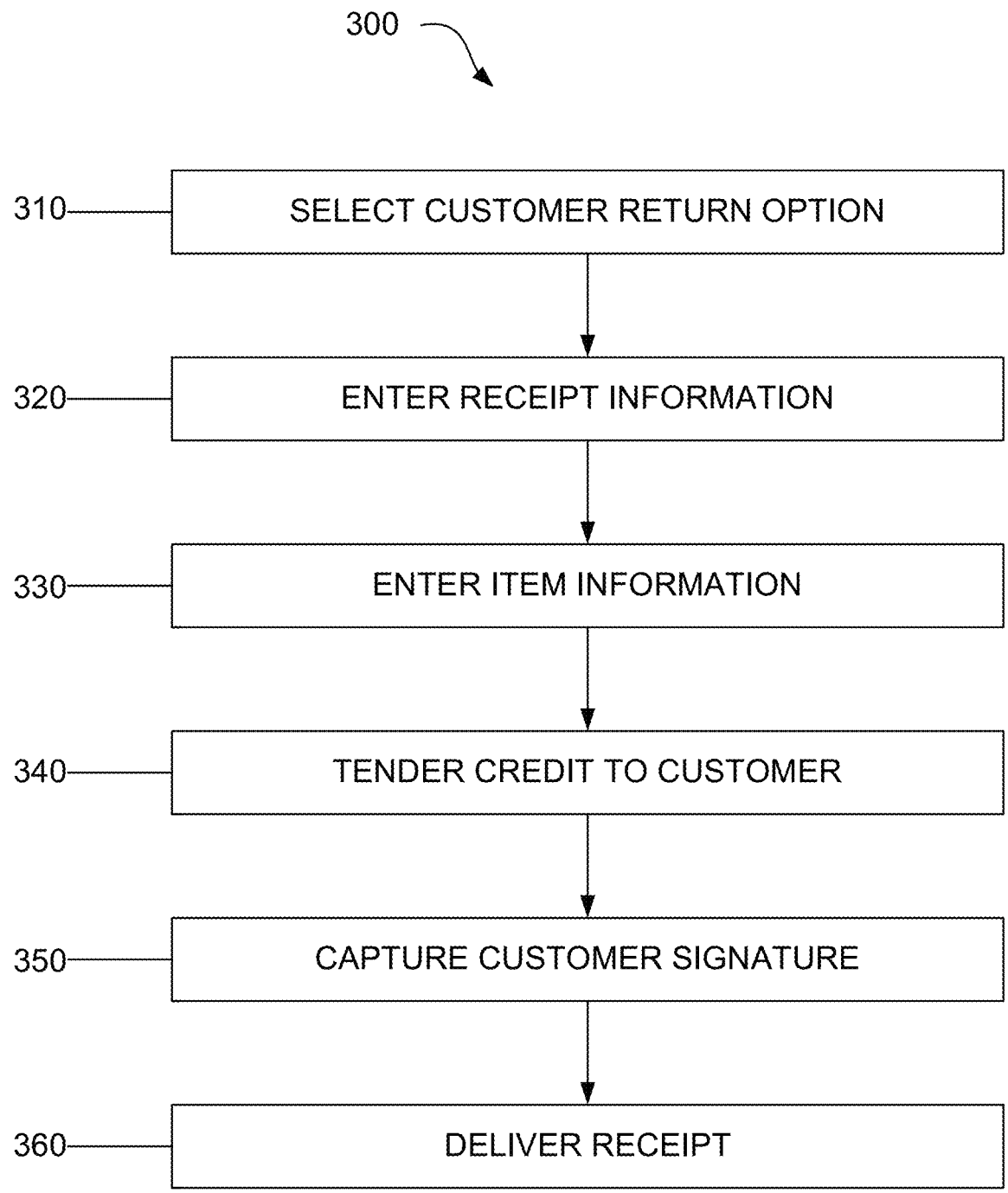
FIG. 3 depicts an embodiment of a method that includes a trained returns mode.

FIG. 3 illustrates a trained returns mode method 300. Trained returns mode method 300 may be implemented by certain mobile devices 102 issued to users qualified to operate one or more software applications that implement (or that can be used to accomplish) trained returns mode method 300. For example, this may be a store employee who has completed a certain level of training in the operation of mobile device 102 and mobile returns method 200. In the embodiment shown, a trained user (a user trained to carry out trained returns mode method 300) may begin method 300 at step 310 by selecting a customer returns option from a user interface on mobile device 102. In the embodiment shown, the trained user may continue method 300 at step 320 by entering receipt information into mobile device 102. Step 320 may be implemented the same as or similarly to step 220 of method 200. Also, the receipt information may be the same as or similar to the receipt information used in step 220 of method 200. Namely, the receipt information may be identification information linked to information associated with one or more goods and/or services purchased by the owner or possessor of the receipt information.

In the embodiment shown, the trained user may continue method 300 at step 330 by entering item information. Step 330 may be implemented the same as or similarly to step 250 of method 200. Also, the item information may be the same as or similar to the item information used in step 250 of method 200. Namely, the item information may be identification information implemented as a bar code, identification number, or other suitable identification information.

In the embodiment shown, the trained user may continue method 300 at step 340 by tendering a credit to a customer. In this step, the trained user may have the option to tender a refund to a stored credit card, issue a store credit onto a proprietary card usable by the customer, or tender a credit electronically to the customer's email address. If a customer elects to receive the store credit electronically, the customer may redeem the credit by presenting a printout of the email or an email attachment to a cashier or by presenting a scannable electronic version on a mobile device. In some embodiments, in cases where the customer elects to receive store credit electronically, the customer may receive an email containing a link to a third party website. Upon interaction with the link, the customer may access the store credit from the third party website. The customer may redeem the credit by presenting a printout of the store credit to a cashier or presenting a scannable electronic version of the store credit on a mobile device. The trained user may also have the option to tender a replacement item to the customer using an RTV capability.

In the embodiment shown, the trained user may continue method 300 at step 350 by capturing the customer's signature. The customer's signature may serve as a record that a replacement transaction was completed. The customer may input a signature via a touchscreen or touchpad of mobile device 102. The customer may sign the signature using a finger, stylus, or other suitable apparatus. In the embodiment shown, the trained user may continue method 300 at step 360 by delivering a receipt to the customer. In some embodiments, a paper receipt may be printed using printer device 106. In some embodiments, a paper receipt may be printed using a mobile printer or a printer of mobile device 102. In some embodiments, the trained user may deliver an electronic receipt to a customer's email address. The registered customer account may be a rewards or membership account.

Figure 4:
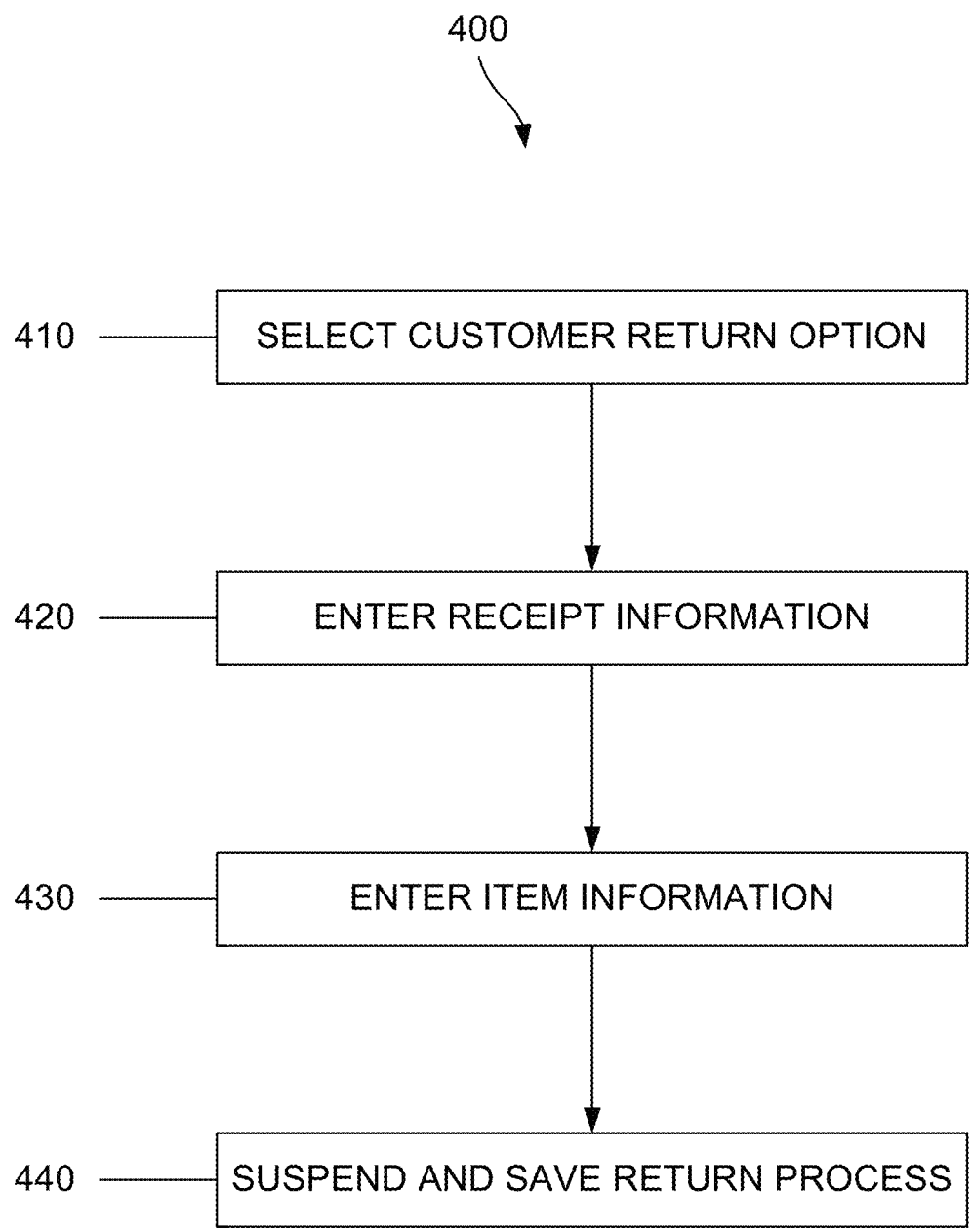
FIG. 4 depicts an embodiment of a method that includes an expedited returns mode.

FIG. 4 illustrates an expedited returns mode method 400. Expedited returns mode method 400 may be implemented by certain mobile devices 102 issued to users not qualified to operate one or more software applications that implement trained returns mode method 300. This may be a store employee who has not completed the necessary training to operate mobile device 102 in a trained returns mode. An expedited returns mode that enables performance of expedited returns mode method 400 can be made available via mobile devices 102 to a first group of employees (that includes a second group of employees, who form a subset of the first group of employees, and who are trained to perform trained returns mode method 300) so that all the employees in the first group of employees (which may, in some embodiments, include all levels of employees at a given retail store) may operate mobile device 102 in a productive manner. In the embodiment shown, an expedited user (a user trained to carry out expedited returns mode method 400) may begin method 400 at step 410 by selecting a customer returns option from a user interface on mobile device 102. In the embodiment shown, the expedited user may continue method 400 at step 420 by entering receipt information. Step 420 may be implemented the same as or similarly to step 220 of method 200 or step 320 of method 300. Also, the receipt information may be the same as or similar to the receipt information used in step 220 of method 200 or step 320 of method 300. Namely, the receipt information may be identification information linked to information associated with one or more goods and/or services purchased by the owner or possessor of the receipt information.

In the embodiment shown, the expedited user may continue method 400 at step 430 by entering item information. Step 430 may be implemented the same as or similarly to step 250 of method 200 or step 330 of method 300. Also, the item information may be the same as or similar to the item information used in step 250 of method 200 or step 330 of method 300. Namely, the item information may be identification information implemented as a bar code, identification number, or other suitable identification information.

In the embodiment shown, the expedited user may continue method 400 at step 440 by suspending and saving the return process. The expedited user may enter a customer name to identify the suspended return process. A trained user may later recall the suspended return process on mobile device 102 and complete the return process by performed steps 340, 350, and 360 of trained returns mode method 300. Alternatively, the suspended return process may be recalled by a returns cashier on a non-mobile device, such as one assigned to a dedicated position in a retail store, such as at a register or behind a counter or desk.

FIGS. 5-14 shows examples of a graphical user interface (GUI) that may be displayed using mobile device 102. The GUI may be used by a user to implement one or more software applications on one or more servers 108 to perform one or more of methods 200, 300, and 400. In the embodiments shown, the GUI uses a Windows platform. The GUI may also be implemented using other suitable platforms, such as Android, Windows, and Apple iOS.

Figure 5:
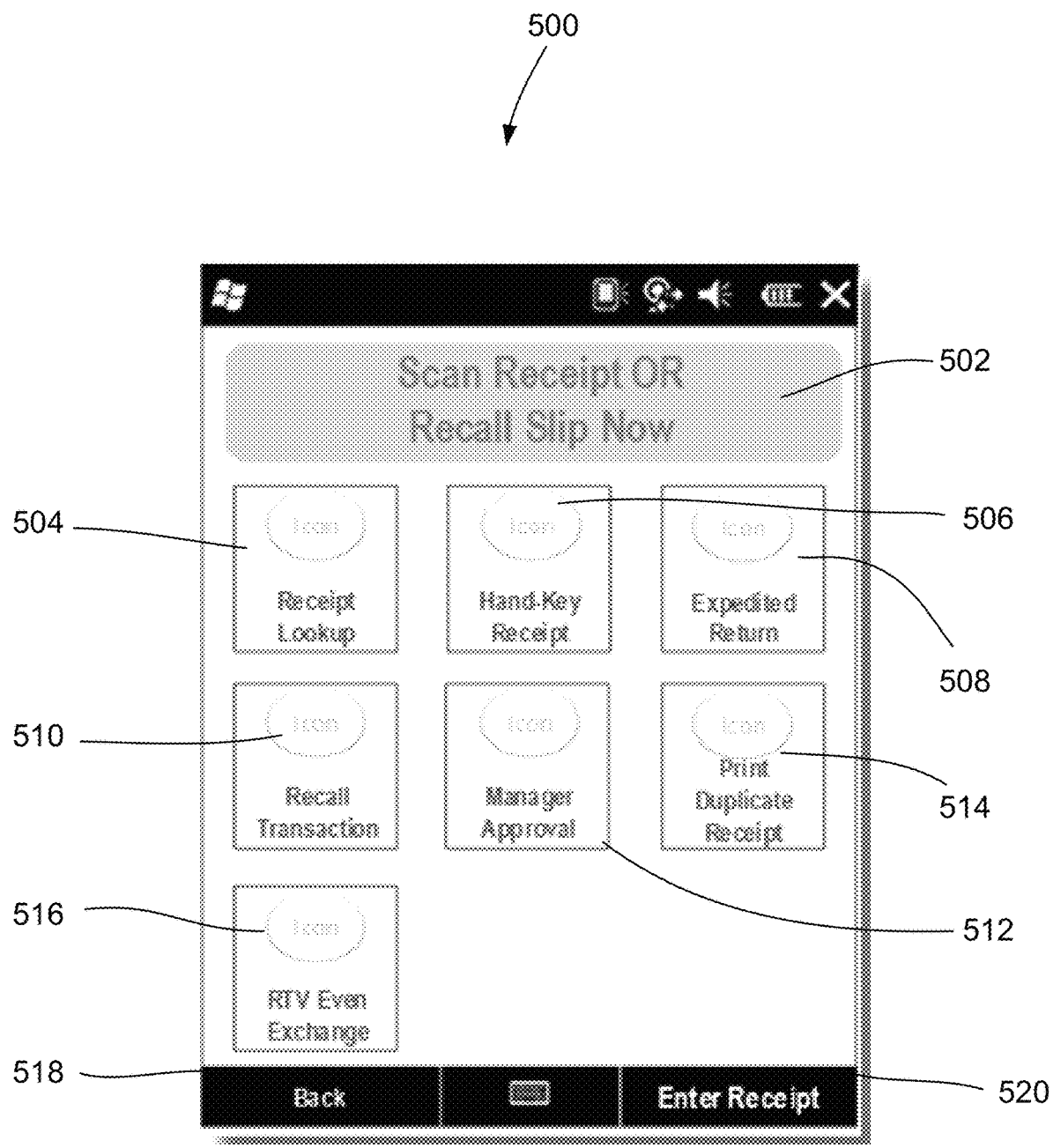
FIG. 5 depicts a main menu interface displayable during an embodiment of the of the trained returns mode.

FIG. 5 shows a main menu interface 500, which comprises icons or buttons for initiating and/or accomplishing various functions, including scan receipt icon 502, receipt lookup icon 504, hand-key receipt icon 506, expedited return icon 508, recall transaction icon 510, manager approval icon 512, print duplicate receipt icon 514, and RTV even exchange icon 516. Main menu interface 500 may further comprise BACK button 518 and ENTER RECEIPT button 520. In the embodiment shown, main menu interface 500 is preprogrammed with both a trained returns mode (which also may be characterized as a trained mode) and an expedited returns mode (which also may be characterized as an expedited mode). In the embodiment shown, the mobile device implements a trained returns mode by default. A trained employee may select expedited return icon 508 to access an expedited returns mode.

In some embodiments, an employee may be granted access to either an expedited mode or a trained mode based on identifying information such as login credentials. For example, when a trained employee enters login credentials, the trained employee may be automatically granted access to the trained mode. When an untrained employee enters login credentials, the untrained employee may be automatically granted access to the expedited mode. In some embodiments, the mobile device may be preprogrammed with either a trained returns mode or an expedited returns mode. In such embodiments, expedited return icon 508 may not be present in main menu interface 500 that implements only a trained returns mode.

The functionality triggered by selecting scan receipt icon 502 may allow the trained user to scan a paper receipt or a recall slip. In the embodiment shown, main menu interface 500 may only be used if a receipt is available. In the embodiment shown, if no receipt is available or a receipt cannot be validated, a customer must visit a customer service register or otherwise use a different return method. The functionality triggered by selecting receipt lookup icon 504 may allow the trained user to use search terms to lookup receipt information stored on one or more servers 108. The functionality triggered by selecting hand-key receipt icon 506 may allow the trained user to enter receipt information using a keypad of a touchscreen. After receipt information is entered using one of the above methods, a trained user may select ENTER RECEIPT button 520 to proceed to the next step.

In some embodiments, the functionality triggered by selecting expedited return icon 508 may allow a trained user to enter an expedited returns mode. The functionality triggered by selecting recall transaction icon 510 may allow a trained user to recall a suspended transaction, either from themself or from another user. The trained user may then complete the suspended transaction. The functionality triggered by selecting manager approval icon 512 may allow a trained user to flag a transaction for review by a supervisor. The functionality triggered by selecting print duplicate receipt icon 514 may allow a trained user to print a receipt upon completion of the return transaction. The functionality triggered by selecting RTV even exchange icon 516 may allow a trained user to perform an RTV action and tender a replacement product to a customer.

Figure 6:
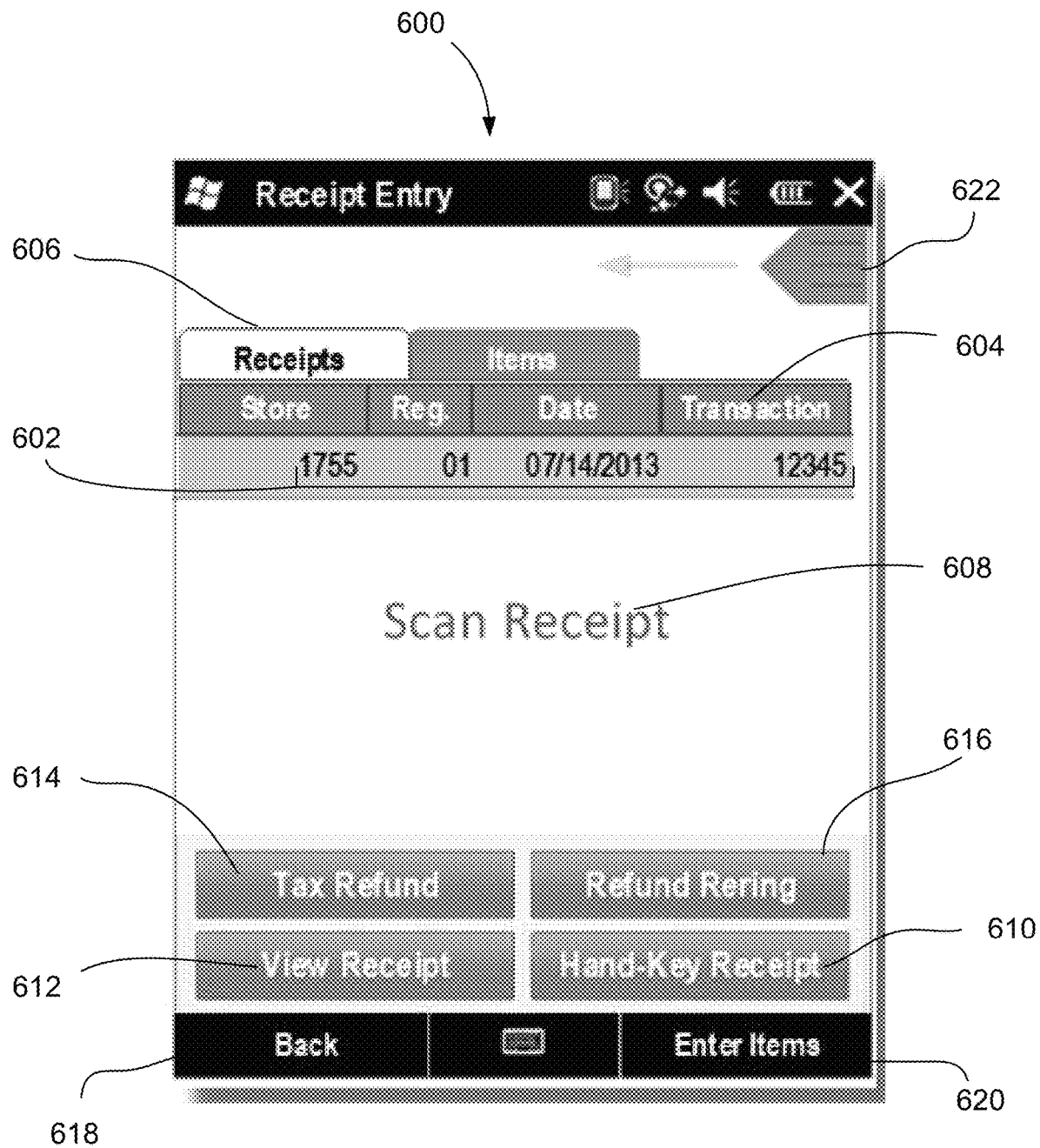
FIG. 6 depicts a receipt entry interface displayable during an embodiment of the trained returns mode.

FIG. 6 shows a receipt entry interface 600, which is displayed after scan receipt icon 502, receipt lookup icon 504, or hand-key receipt icon 506 are selected from main menu interface 500. Receipt information 602 may be displayed and categorized into various fields 604. Receipt information 602 may be selected by a user to trigger functionality that allows the user to toggle between multiple entered receipts. Receipt information 602 may be organized in various ways by selecting fields 604. The functionality triggered by selecting "Receipts" tab 606 may display the features of receipt entry interface 600 shown in FIG. 6, and otherwise enable a user to switch to this interface from a different interface, such as the one shown in FIG. 7 corresponding to the "Items" tab (shown but unlabeled in FIG. 6). Instruction field 608 may be provided to assist the user. In the embodiment shown, instruction field 608 instructs the user that a scan receipt functionality is available to enter additional receipt information. Alternatively, a functionality triggered by selecting hand-key receipt button 610 may allow a user to manually enter receipt information using a keypad or touchscreen. The functionality triggered by selecting view receipt button 612 may allow a user to view the receipt corresponding to selected receipt information 602.

In the embodiment shown, tax refund button 614 and refund rering button 616 are provided. The functionality triggered by selecting these buttons may enable a user to perform refund and rering transactions for selected receipt information 602. The functionality triggered by selecting tax refund button 614 may enable a user to tender a tax refund to a tax exempt customer for a selected receipt information 602. A user may refund just the tax portion of a transaction without needing to complete full refund and repurchase transactions of all items on the receipt. The functionality triggered by selecting refund rering button 616 may enable a user to tender refund to or rering an eligible customer for a selected receipt information 602. For example, a customer may present a coupon or a membership rewards ID number. A user may rering the transaction to apply the coupon or membership rewards discount without needing to complete full refund and repurchase transactions of all items on the receipt.

In the embodiment shown, BACK button 618, ENTER ITEMS button 620, and slidable arrow 622 are provided. The functionality triggered by swiping slidable arrow 622 in a backward direction may enable a user to delete selected receipt information 602. In some embodiments, slidable arrow 622 may not be present. In such embodiments, a delete function may be implemented using a Delete button or other suitable icon. The functionality triggered by selecting BACK button 618 may enable a user to return to the previous screen. The functionality triggered by selecting ENTER ITEMS button 620 may enable a user to proceed to the next step of the transaction.

Figure 7:
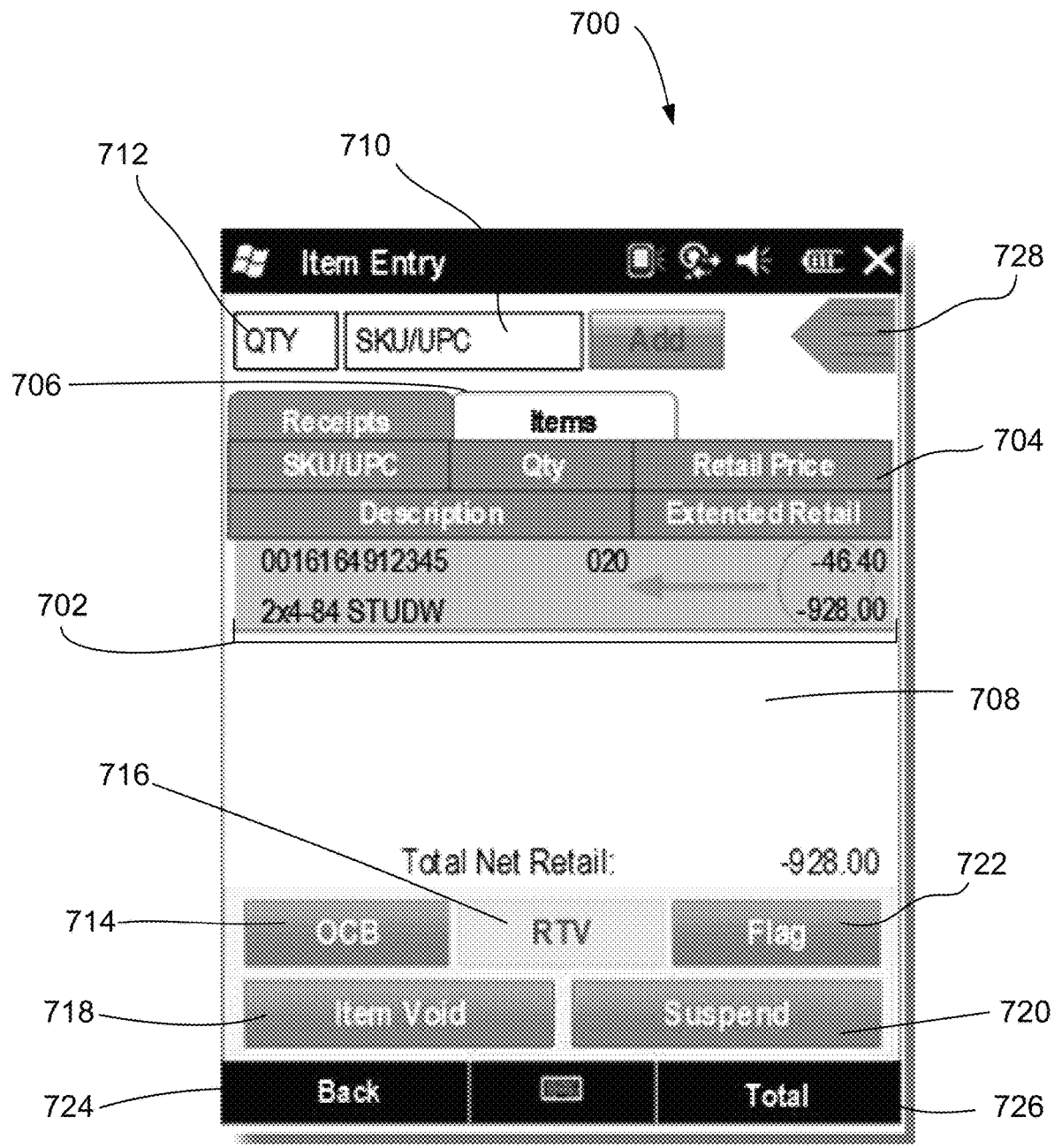
FIG. 7 depicts an item entry interface displayable during an embodiment of the trained returns mode.

FIG. 7 shows an item entry interface 700, which is displayed after ENTER ITEMS button 630 is selected from receipt entry interface 600. Item information 702 may be displayed and categorized into various fields 704. Item information 702 may be selected by a user to trigger a functionality that enables the user to toggle between multiple entered items. Item information 702 may be organized in various ways by selecting fields 704, such as SKU/UPC, quantity, retail price, description, and extended retail price (the total price based on the quantity multiplied by the retail price). The functionality triggered by selecting "Items" tab 706 may display the features of item entry interface 700 shown in FIG. 7, and otherwise enable a user to switch to this interface from a different interface, such as receipt entry interface 600 corresponding to the "Receipts" tab (shown but unlabeled in FIG. 7). Display field 708 may be provided to display refund price information to the user.

In the embodiment shown, a user may enter an item using an identification number in field 710. A user may also enter a quantity of an item in field 712. A user may add the item and quantity in fields 710 and 712 as an entry of item information 702. Alternatively, a user may scan an item to add the item as an entry of item information 702.

In the embodiment shown, online cashier book (OCB) button 714 and RTV button 716 are provided. The functionality triggered by selecting OCB button 714 may enable a user to look up an item in an inventory. This function may be useful when an item is unable to be scanned or entered using an identification number in field 710. The functionality triggered by selecting RTV button 716 may enable a user to perform an RTV transaction for a selected item information 702. This may enable a user to return an unwanted or defective item and provide a replacement item to a customer.

In the embodiment shown, item void button 718, Suspend button 720, and flag button 722 are provided. The functionality triggered by selecting item void button 718 may enable a user to void an item from a return transaction. The functionality triggered by selecting Suspend button 720 may enable a user to suspend a return transaction until a later time. The functionality triggered by selecting flag button 722 may enable a user to flag a return transaction for later review by the user or a supervisor.

In the embodiment shown, BACK button 724, TOTAL button 726, and slidable arrow 728 are provided. The functionality triggered by swiping slidable arrow 728 in a backward direction may enable a user to delete selected item information 702 or information in fields 710 and 712. In some embodiments, slidable arrow 728 may be omitted and replaced with an alternative element for deleting selected item information 702 or information in fields 710 and 712. The functionality triggered by selecting BACK button 724 may enable a user to return to the previous screen. The functionality triggered by selecting TOTAL button 726 may enable a user to calculate the total net retail return amount for all selected item information 702 and proceed to the next step of the transaction.

Figure 8:
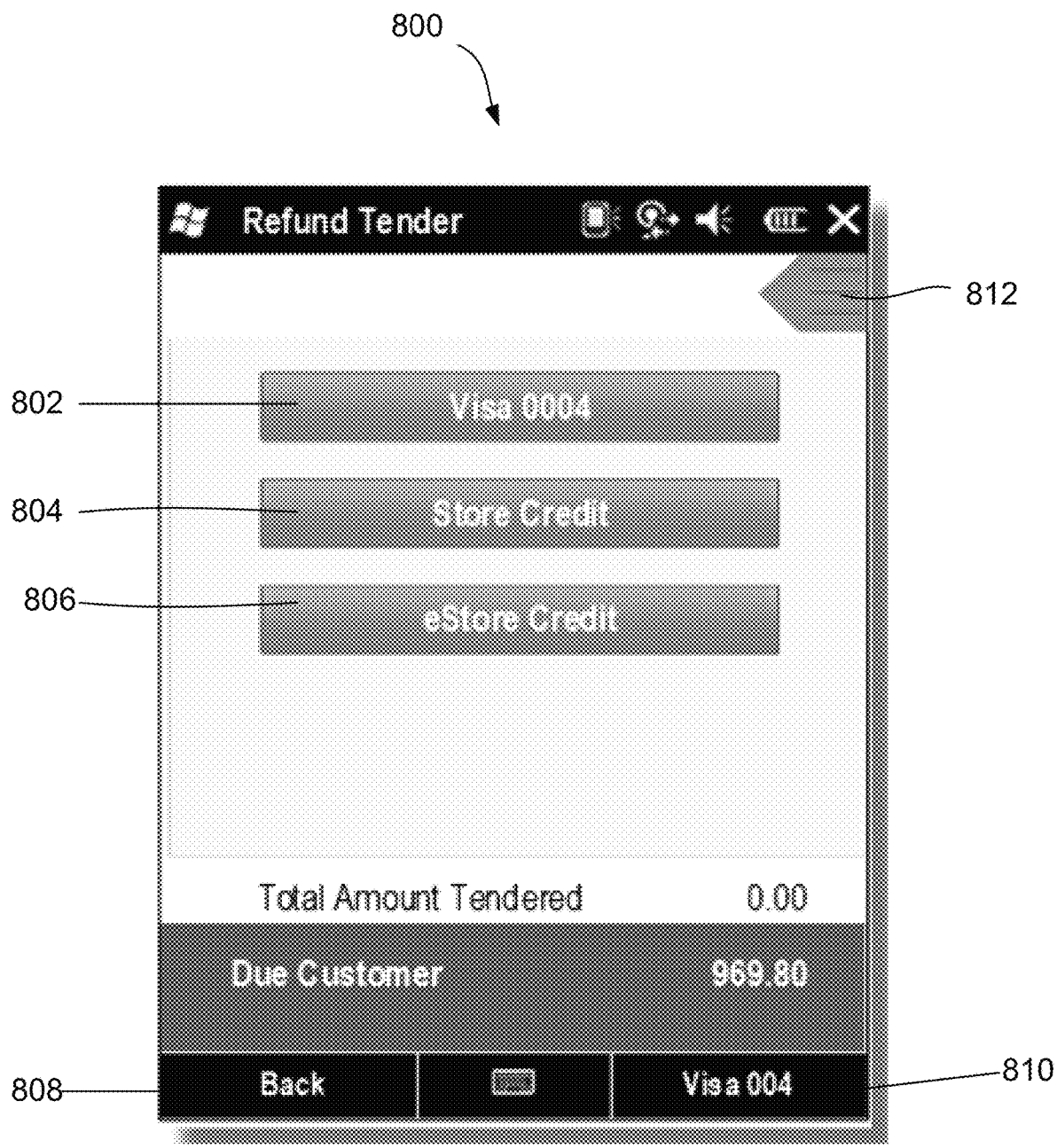
FIG. 8 depicts a tender interface displayable during an embodiment of the trained returns mode.

FIG. 8 shows a refund tender interface 800, which is displayed after TOTAL button 726 is selected from item entry interface 700. In the embodiment shown, stored credit card button 802, store credit button 804, and customer account credit button 806 are provided. The functionality triggered by selecting stored credit card button 802 may enable a user to tender a refund to a customer's stored credit card. The credit card information may be stored in one or more servers 108. The stored credit card may be a credit card used to initially purchase the returned item or another credit card provided by the customer. The functionality triggered by selecting store credit button 804 may enable a user to tender a store credit for the amount of the returned item. The functionality triggered by selecting customer account credit button 806 may enable a user to tender a store credit for the amount of the returned item electronically to an email address of the customer.

In the embodiment shown, BACK button 808, forward button 810, and slidable arrow 812 are provided. In the embodiment shown, forward button 810 may populate to reflect a selection of stored credit card button 802, store credit button 804, or customer account credit button 806. The functionality triggered by swiping slidable arrow 812 in a backward direction may enable a user to unselect a selection of stored credit card button 802, store credit button 804, or customer account credit button 806. In some embodiments, slidable arrow 812 may not be present. In such embodiments, an unselect function may be implemented using an Unselect button or other suitable icon. The functionality triggered by selecting BACK button 808 may enable a user to return to the previous screen. The functionality triggered by selecting forward button 810 may enable a user to proceed to the next step of the transaction.

Figure 9:
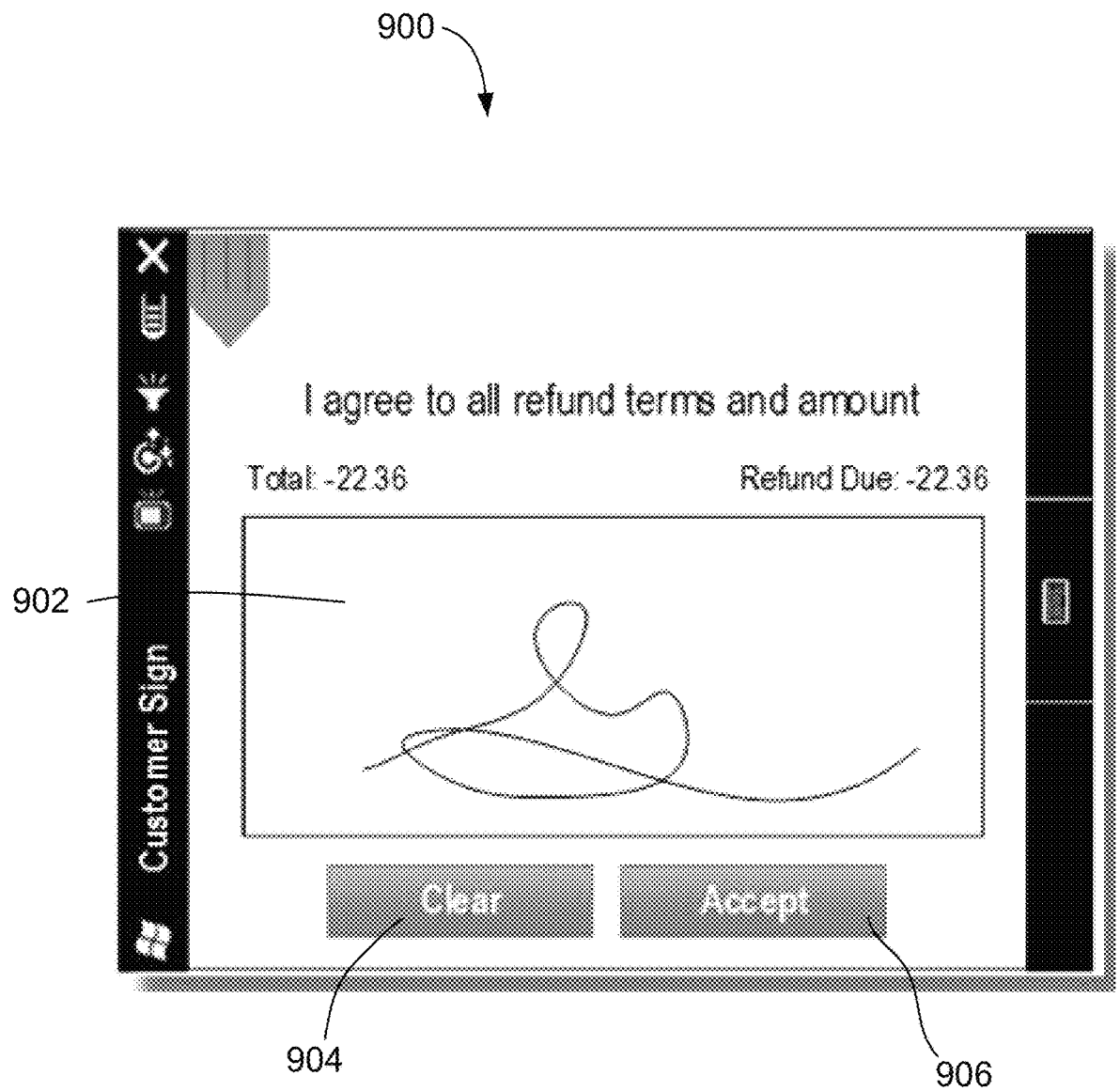
FIG. 9 depicts a capture signature interface displayable during an embodiment of the trained returns mode.

FIG. 9 shows a capture signature interface 900, which is displayed after forward button 810 is selected from refund tender interface 800. In the embodiment shown, signature field 902, clear button 904, and accept button 906 are provided. Signature field 902 may enable a user to capture a signature of a customer to process a return transaction. The customer may sign the signature field using, for example, a stylus or a finger. After the signature is collected, the functionality triggered by selecting clear button 904 may enable the user to clear the signature if there is a signing error. Alternatively, the functionality triggered by selecting accept button 906 may enable the user to accept the signature and create a record of the return transaction.

Figure 10A:
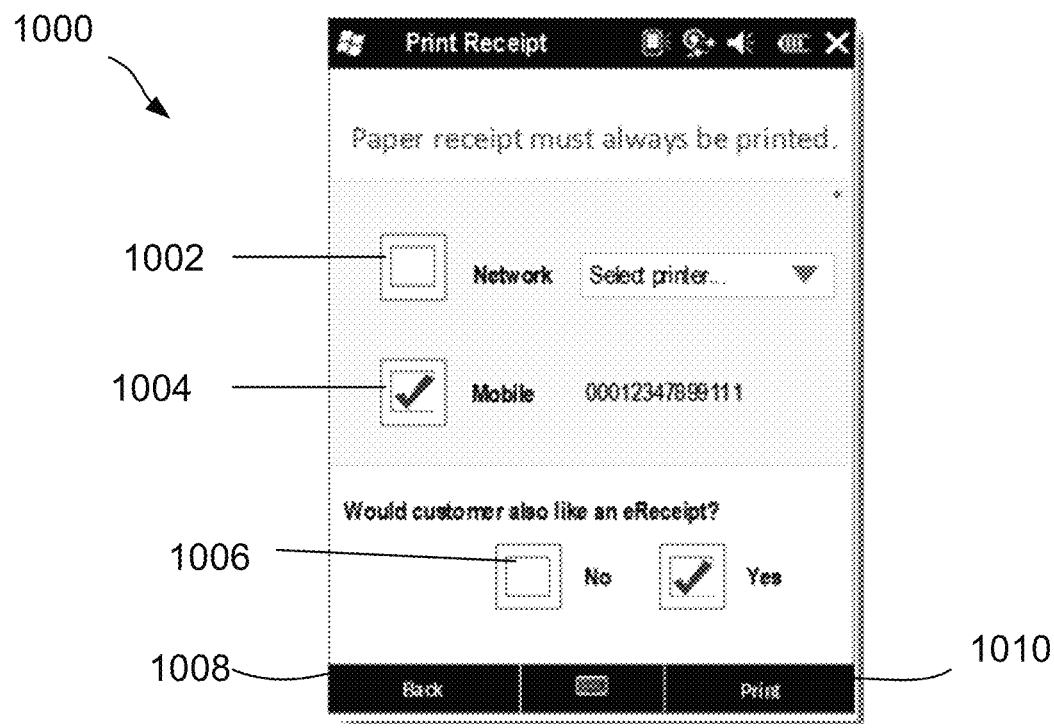
FIGS. 10A and 10B depict aspects of a receipt delivery interface displayable during an embodiment of the trained returns mode.
Figure 10B:
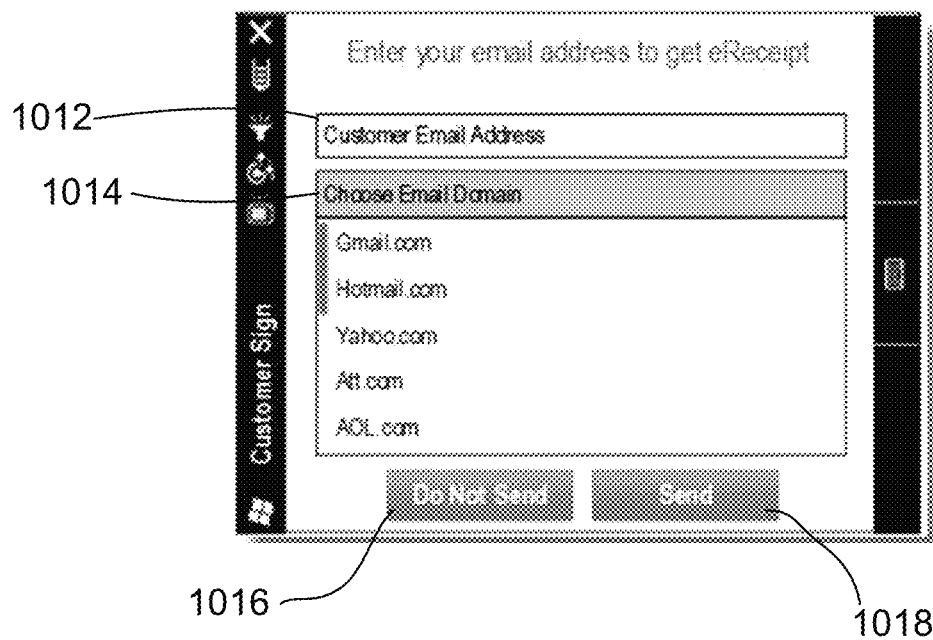

FIGS. 10A-B shows a receipt delivery interface 1000, which may be displayed after accept button 906 is selected from capture signature interface 900. In the embodiment shown, a user may select one or more receipt delivery methods. In the embodiment shown, a paper receipt must be printed for every return transaction. The functionality triggered by selecting network printer box 1002 may enable a user to print a paper receipt at a network printer. The network printer may be printing device 106 or another network minter. The functionality triggered by selecting mobile printer box 1004 may enable a user to print a paper receipt using mobile printing device 107. The functionality triggered by selecting an electronic receipt box 1006 may enable a user to deliver an electronic receipt to an email address or registered customer account of the customer. In the embodiment shown, BACK button 1008 and PRINT button 1010 are provided. The functionality triggered by selecting BACK button 1008 may enable the user to return to the previous screen. The functionality triggered by selecting PRINT button 1010 may to enable a user to print a paper receipt. Although the embodiment shown in FIG. 10A requires a receipt printing choice, some embodiments of receipt delivery interface 1000 may not require a receipt to be printed. In some embodiments, a user may select a receipt delivery option from a plurality of options displayed in receipt delivery interface 1000. For example, the receipt delivery options may include options to receive a printed receipt via one or more printing methods, to only receive an electronic receipt via email or other electronic delivery medium, or to forgo receiving or printing a receipt entirely.

In the embodiment shown in FIG. 10B, email address field 1012, email domain field 1014, Do Not Send button 1016, and SEND button 1018 are provided. The functionality triggered by selecting the Yes electronic receipt box 1006 may enable a user to enter a customer's email address in email address field 1012. Alternatively or additionally, the functionality may enable the user to select an email domain (such as those listed in FIG. 10B) in email domain field 1014 corresponding to a customer's email address. After the email address is entered, the functionality triggered by selecting Do Not Send button 1016 may enable the user to prevent receipt delivery if there is an error. Alternatively, the functionality triggered by selecting SEND button 1018 may enable the user to send the electronic receipt to the entered email address.

Figure 11:
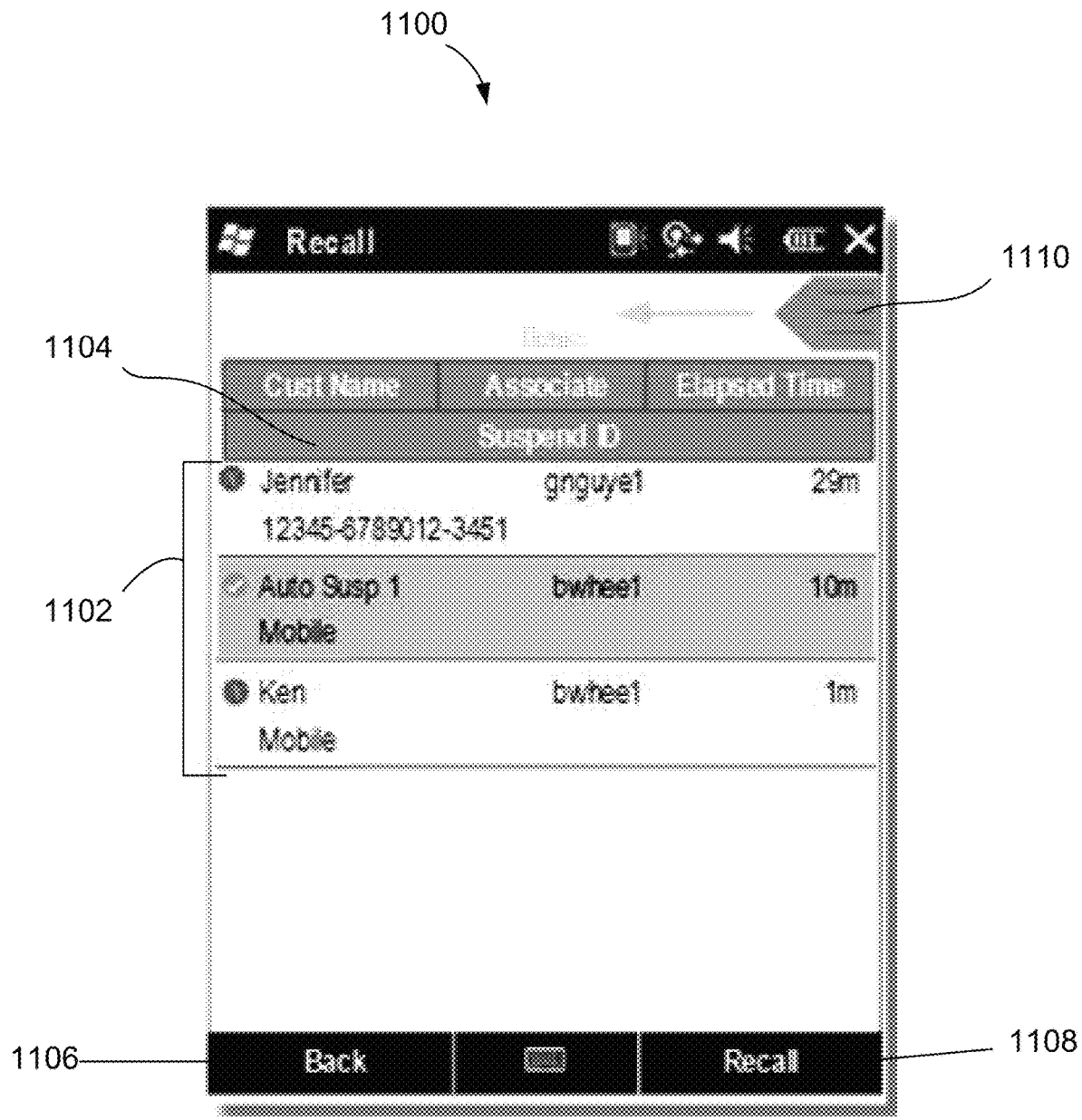
FIG. 11 depicts a recall interface displayable during an embodiment of the trained returns mode.

FIG. 11 shows a recall interface 1100, which is displayed after recall transaction icon 510 is selected from main menu interface 500. Recall information 1102 may display suspended transactions and may categorize them into various fields 1104, such as the customer's name, the associate's name (the name of the user), the elapsed time since the return transaction was suspended, and "Suspend ID" (identification information corresponding to a particular return transaction). A functionality triggered by selecting recall information 1102 may enable a user to toggle between multiple entered recall transactions. The functionality triggered by selecting fields 1104 may enable a user to organize and/or display recall information 1102 in various ways.

In the embodiment shown, BACK button 1106, RECALL button 1108, and slidable arrow 1110 are provided. The functionality triggered by swiping slidable arrow 1110 in a backward direction may enable a user to delete selected recall information 1102. The functionality triggered by selecting BACK button 1106 may enable a user to return to the previous screen. The functionality triggered by selecting RECALL button 1108 may enable a user to recall a selected transaction. A user may then perform any or all of the functions previously discussed in this disclosure.

Figures 12A, 12B:
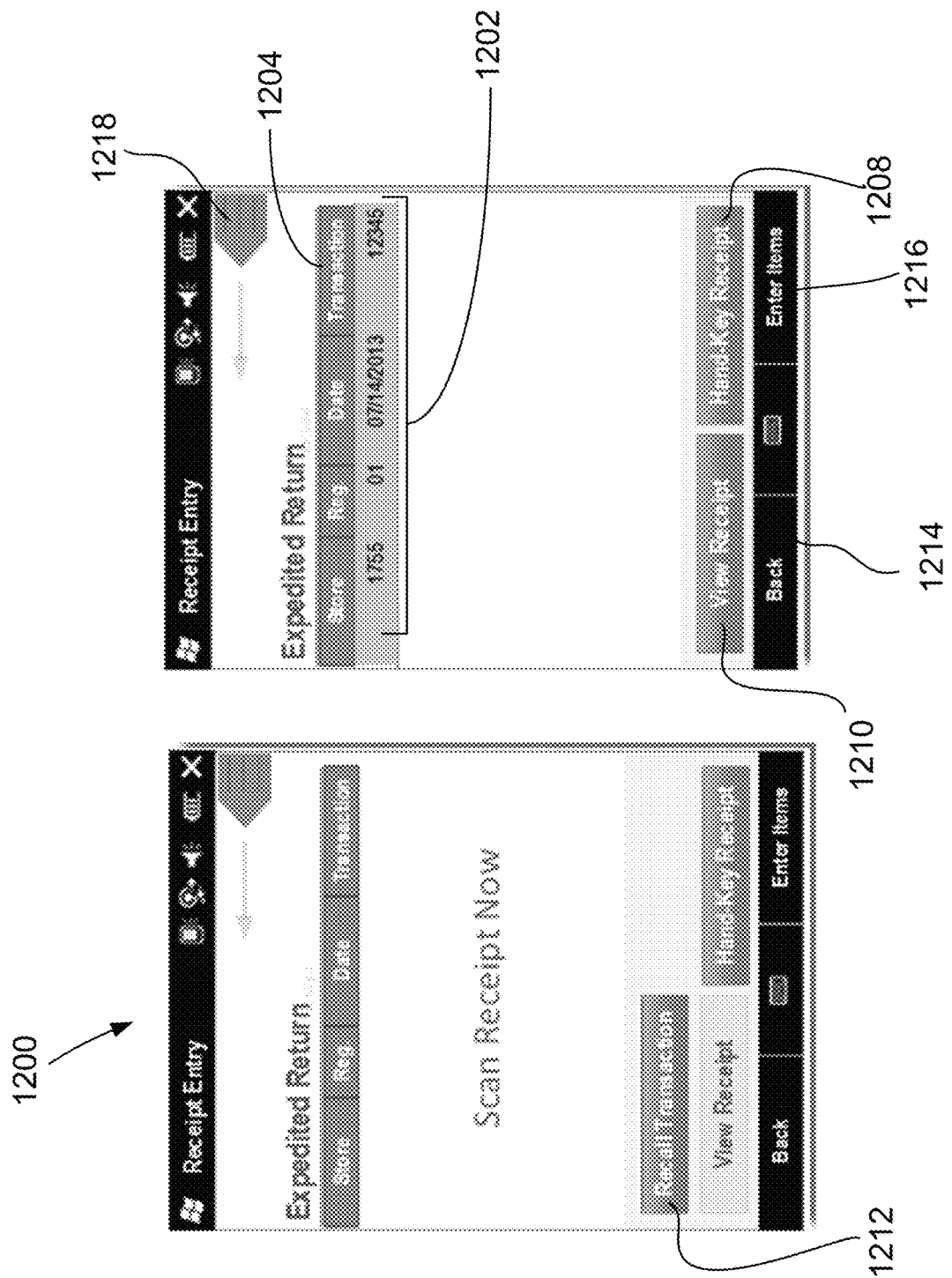
FIGS. 12A and 12B depict aspects of a receipt entry interface displayable during an embodiment of the expedited returns mode.

FIGS. 12A-B show an expedited receipt entry interface 1200 for an expedited returns mode, which is displayed after expedited return icon 508 is selected from main menu interface 500. Alternatively, expedited receipt entry interface 1200 is displayed as an initial interface for an expedited user. Receipt information 1202 may be displayed and categorized into various fields 1204, such as the store number where the purchase was made, the register number where the purchase was made, the date of the purchase, and the transaction identification number associated with the purchase. Receipt information 1202 may be selected by a user to trigger a functionality that enables the user to toggle between multiple entered receipts. The functionality triggered by selecting fields 1204 may enable a user to organize and/or display receipt information 1202 in various ways. Instruction field 1206 may be provided to assist the user. In the embodiment shown, instruction field 1206 instructs the user that a scan receipt functionality is available to enter additional receipt information. Alternatively, a user may select hand-key receipt button 1208 to trigger functionality that enables the user to manually enter receipt information using a keypad or touchscreen. The functionality triggered by selecting view receipt button 1210 may allow a user to view the receipt corresponding to selected receipt information 1202. The functionality triggered by selecting recall transaction button 1212 may enable a user to display recall interface 1100.

In the embodiment shown, BACK button 1214, ENTER ITEMS button 1216, and slidable arrow 1218 are provided. The functionality triggered by swiping slidable arrow 1218 in a backward direction may enable a user to delete selected receipt information 1102. The functionality triggered by selecting BACK button 1214 may enable a user to return to the previous screen. The functionality triggered by selecting ENTER ITEMS button 1216 may enable a user to proceed to the next step of the transaction.

Figure 13:
FIG. 13 depicts an item interface displayable during an embodiment of the expedited returns mode.

FIG. 13 shows an expedited item entry interface 1300, which is displayed after ENTER ITEMS button 1216 is selected from receipt entry interface 1200. The functionality is similar to item entry interface 700 shown in FIG. 7. However, in the embodiment shown, expedited item entry interface 1300 does not include RTV button 716 or TOTAL button 724 because expedited returns mode does not enable those functionalities.

Figure 14:
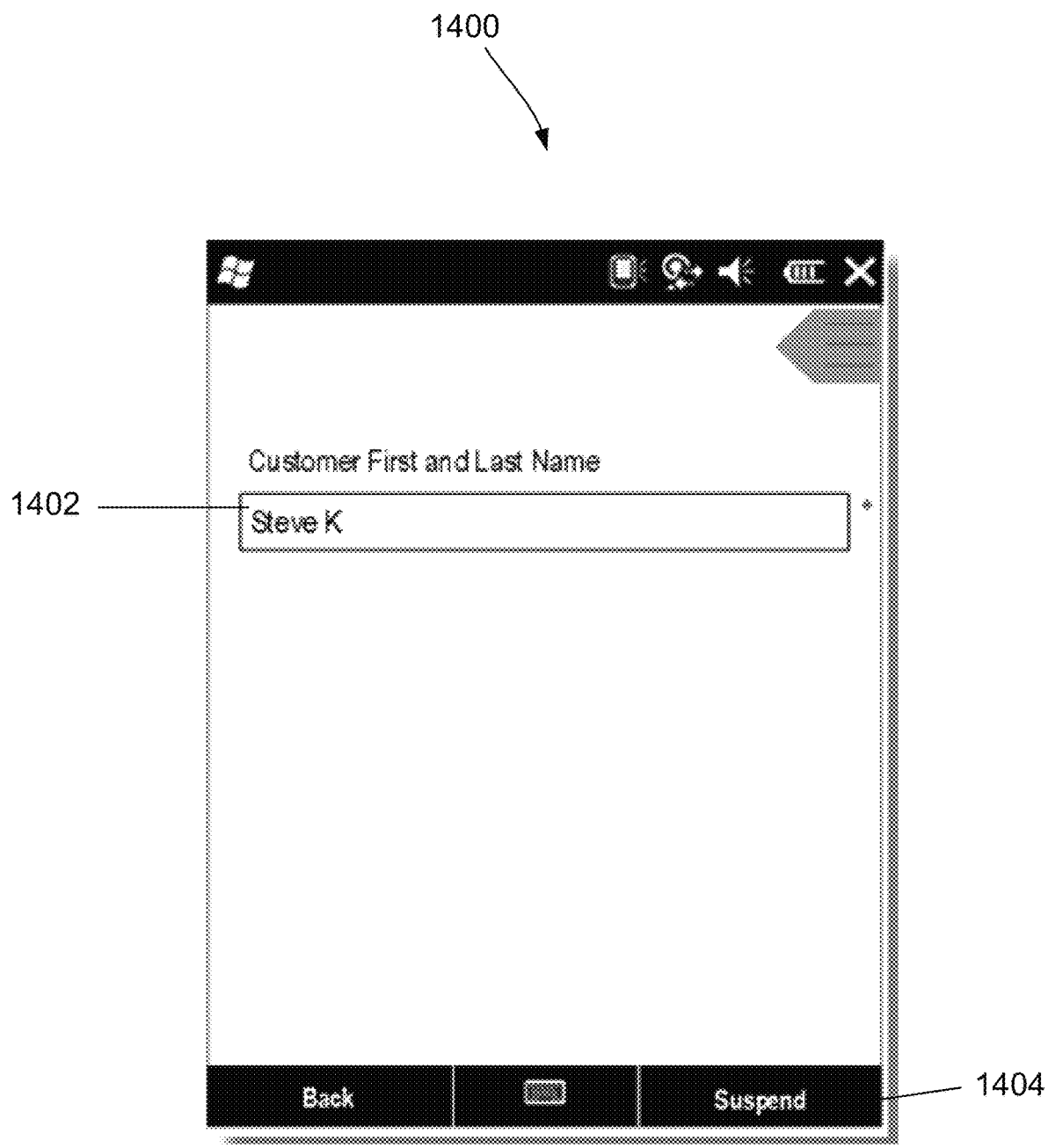
FIG. 14 depicts a suspend interface displayable during an embodiment of the expedited returns mode.

FIG. 14 shows a suspend interface 1400, which is displayed after Suspend button 720 is selected from item entry interface 700 or expedited item entry interface 1300. In the embodiment shown, name field 1402 and Suspend button 1404 are provided. The functionality triggered by selecting name field 1402 may enable a user to enter a name of a customer to process a suspend return transaction. The functionality triggered by selecting Suspend button 1404 may enable a user to save the suspended transaction under the customer name and a user identifier. The suspended transaction may be completed by a trained user upon accessing recall interface 1100 shown in FIG. 11. The trained user may complete the suspended transaction on mobile device 102 or a returns register.

If implemented in firmware and/or software, the functions described above may be stored as one or more instructions or code on a non-transitory computer-readable medium. Examples include non-transitory computer-readable media encoded with a data structure and non-transitory computer-readable media encoded with a computer program. Non-transitory computer-readable media are physical computer storage media. A physical storage medium may be any available medium that can be accessed by a computer. By way of example, and not limitation, such non-transitory computer-readable media can comprise RAM, ROM, EPROM, EEPROM, CD-ROM or other optical disk storage, magnetic disk storage or other magnetic storage devices, or any other physical medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above are also be included within the scope of non-transitory computer-readable media. Moreover, the functions described above may be achieved through dedicated devices rather than software, such as a hardware circuit comprising custom VLSI circuits or gate arrays, off-the-shelf semiconductors such as logic chips, transistors, or other discrete components, all of which are non-transitory. Additional examples include programmable hardware devices such as field programmable gate arrays, programmable array logic, programmable logic devices or the like, all of which are non-transitory. Still further examples include application specific integrated circuits (ASIC) or very large scale integrated (VLSI) circuits. In fact, persons of ordinary skill in the art may utilize any number of suitable structures capable of executing logical operations according to the described embodiments.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the disclosed methods, devices, and systems are not intended to be limited to the particular forms disclosed. Rather, they include all modifications and alternatives falling within the scope of the claims, and embodiments other than those shown may include some or all of the features of the depicted embodiments. For example, components may be combined as a unitary structure and/or connections may be substituted. Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

What is claimed is:

1. A method comprising:
    initiating, by a processor of a mobile device, a session of a mobile returns interface on the mobile device, the mobile device configured to communicate with one or more servers;
    receiving, by the processor, receipt information through the mobile returns interface;
    sending, by the processor in response to receiving the receipt information, a receipt information validation request to the one or more servers;
    receiving, by the processor from the one or more servers, a first validation that the receipt information is stored on the one or more servers;
    receiving, by the processor, item information through the mobile returns interface comprising:
        receiving a command to scan an item through the mobile returns interface, and
        scanning the item using a scanner of the mobile device;
    sending, by the processor in response to receiving the item information, an item information validation request to the one or more servers;
    receiving, by the processor from the one or more servers, a second validation that the item information is stored on the one or more servers; and
    performing an item transaction associated with the receipt information and the item information in response to receiving the first validation and the second validation.

2. The method of claim 1, wherein performing the item transaction comprises:
    determining, based on information from the one or more servers, an identity of a customer, wherein the identity of the customer comprises information indicating that the customer is at least one of:
        a tax exempt customer,
        a rewards customer, or
        a customer who has used a coupon; and
    tendering a compensation to the customer based on the identity of the customer, wherein the tendering is performed separately from a tendering of a price compensation to the customer.

3. The method of claim 1, wherein the receiving of the receipt information through the mobile returns interface comprises:
    receiving a command to scan a receipt through the mobile returns interface; and
    scanning a receipt using a scanner of the mobile device.

4. The method of claim 1, wherein the receiving of the receipt information through the mobile returns interface comprises receiving receipt information entered by a user with a keypad interface of the mobile device.

5. The method of claim 1, wherein the receiving of the receipt information through the mobile returns interface comprises receiving customer identification information.

6. The method of claim 1, wherein the receiving of the item information through the mobile returns interface comprises receiving the item information entered by a user with a keypad interface of the mobile device.

7. The method of claim 1, further comprising receiving, by the processor, a refund tender type selection entered by a user through the mobile returns interface.

8. A non-transitory computer readable medium having instructions stored thereon that, upon execution by a computing device, cause the computing device to:
    initiate a session of a mobile returns interface on a mobile device;

receive receipt information through the mobile returns interface, wherein the receipt information is entered using the mobile returns interface by a first user;

send, in response to receiving the receipt information, a receipt information validation request to the one or more servers;

receive, from the one or more servers, a first validation that the receipt information is stored on the one or more servers;

receive item information through the mobile returns interface, wherein the item information is entered using the mobile returns interface by the first user;

send, in response to receiving the item information, an item information validation request to the one or more servers;

receive, from the one or more servers, a second validation that the item information is stored on the one or more servers;

suspend the session of the mobile returns interface after the receipt information validation request and the item information validation request are sent to the one or more servers;

resume the session of the mobile returns interface; and perform an item transaction associated with the receipt information and the item information in response to receiving the first validation and the second validation, wherein the item transaction is initiated in response to an interaction with the mobile returns interface by a second user.

9. The non-transitory computer readable medium of claim 8, wherein the item information comprises product information of one or more products represented in the receipt information.

10. The non-transitory computer readable medium of claim 8, wherein the instructions further cause the computing device to grant access to the resumed session of the mobile returns interface to the second user based on login credentials entered through the mobile returns interface by the second user.

11. The non-transitory computer readable medium of claim 8, wherein the item transaction comprises expiration of a return of one or more items if the session of the mobile returns interface is not resumed by a second user within a certain time limit.

12. The non-transitory computer readable medium of claim 8, wherein the instructions further cause the computing device to:
access an online inventory software located on the one or more servers;
search the online inventory software using the item information; and
receiving search results relating to the item information at the mobile device.

13. A mobile device comprising:
a memory; and
a processor coupled to the memory, wherein the processor is configured to:
initiate a session of a mobile returns interface on the mobile device;
receive receipt information through the mobile returns interface;
send, in response to receiving the receipt information, a receipt information validation request to one or more servers;
receive, from the one or more servers, a first validation that the receipt information is stored on the one or more servers;
receive item information through the mobile returns interface;
send, in response to receiving the item information, an item information validation request to the one or more servers;
receive, from the one or more servers, comprising a second validation that the item information is stored on the one or more servers; and
perform an item transaction associated with the receipt information and the item information in response to receiving the first validation and the second validation, wherein the item transaction comprises:
flagging an item for further review,
voiding an item from the item transaction, or
processing a return-to-vendor (RTV) transaction.

14. The mobile device of claim 13, wherein the performing of the item transaction further comprises:
capturing a customer signature on the mobile device; and
generating a transaction receipt.

15. The mobile device of claim 13, where the item transaction further comprises voiding the return transaction.

* * * * *